(12) United States Patent
Altrichter et al.

(10) Patent No.: US 8,458,716 B2
(45) Date of Patent: Jun. 4, 2013

(54) ENTERPRISE RESOURCE PLANNING WITH ASYNCHRONOUS NOTIFICATIONS OF BACKGROUND PROCESSING EVENTS

(75) Inventors: Ralf Altrichter, Filderstadt (DE); Gerd Kehrer, Meckenheim (DE); Martin Raitza, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1192 days.

(21) Appl. No.: 12/347,128

(22) Filed: Dec. 31, 2008

(65) Prior Publication Data
US 2009/0172692 A1 Jul. 2, 2009

(30) Foreign Application Priority Data

Jan. 2, 2008 (EP) .................................... 08100021

(51) Int. Cl.
*G06F 9/46* (2006.01)
(52) U.S. Cl.
USPC ........... 718/104; 718/103; 711/170; 711/171; 711/172; 711/173; 712/214; 712/215; 715/804; 715/805

(58) Field of Classification Search
None
See application file for complete search history.

(56) References Cited

U.S. PATENT DOCUMENTS

| | | | |
|---|---|---|---|
| 6,473,760 B1 * | 10/2002 | Klatt et al. ............................. | 1/1 |
| 2003/0115190 A1 * | 6/2003 | Soderstrom et al. .............. | 707/3 |
| 2004/0139452 A1 * | 7/2004 | Hope et al. ..................... | 719/318 |
| 2007/0094288 A1 * | 4/2007 | Enenkiel ........................ | 707/101 |
| 2007/0264956 A1 * | 11/2007 | Bicker et al. ............... | 455/186.1 |

OTHER PUBLICATIONS

Search Report, GB, Intellectual Property Office.

* cited by examiner

*Primary Examiner* — Emerson Puente
*Assistant Examiner* — Sisley Kim
(74) *Attorney, Agent, or Firm* — D'Ambrosio & Menon, PLLC

(57) ABSTRACT

Methods, systems, and computer program products for operating an enterprise resource planning system. The method includes running a placeholder job in said enterprise resource planning system in response to a request from at least one client application for notification of at least one background processing event, wherein the placeholder job is executed in response to the at least one background processing event.

13 Claims, 3 Drawing Sheets

ND ASYNCHRONOUS NOTIFICATIONS OF
BACKGROUND PROCESSING EVENTS

PRIORITY

This application is based on and claims the benefit of priority from European Patent Application No. EP08100021.8, filed Jan. 2, 2008.

BACKGROUND

Computerized enterprise resource planning (ERP) commonly defines a set of activities supported by multi-module application software that helps a manufacturer or other business manage various embodiments of its business, including product planning, parts purchasing, maintaining inventories, interacting with suppliers, providing customer service, and tracking orders. ERP can also include application modules for the finance and human resources embodiments of a business.

An external application can access an event history table of the ERP system using a particular program interface, wherein the access is performed in a 'polling mode' that requires a continuous checking of the event history table by the external application.

SUMMARY

Methods, systems, and computer program products are disclosed for entering data into a web page by use of a data processing system, which allows receiving information about ERP background processing events without the need of a polling mechanism.

According to one embodiment of the present invention, in response to a request for notification of background processing events, a dedicated placeholder job is run in the enterprise resource planning system thus eliminating the need of polling an event history table of the underlying ERP system.

In one embodiment, methods, systems, and computer program products are disclosed for operating an enterprise resource planning system. The enterprise resource planning system provides at least one background processing event. The method includes running a placeholder job in said enterprise resource planning system in response to a request from at least one client application for notification of the at least one background processing event. The placeholder job is executed in response to the at least one background processing event.

In one embodiment, the dedicated placeholder job is a job script being started by the ERP system or the RFC server, respectively. According to another embodiment, the placeholder job is scheduled to be executed in response to a background processing event.

According to another embodiment, a server component, such as a remote function call (RFC) server is implemented on an external (client-side) application, wherein this server component waits for callback notifications being issued by the ERP system. The external application is notified of a background processing event using the dedicated placeholder job in the ERP system which is configured to notify the server component of the background event.

According to a further embodiment, the dedicated placeholder job is scheduled to be executed in response to the background processing event. According to a further embodiment, the dedicated placeholder job may use a custom table for storing a server's connection information. According to a further embodiment, the dedicated placeholder job may be configured to call a plurality of servers. According to another embodiment, an event history table may be used to capture past occurrences of an event.

According to still another embodiment, a callback listener may be provided on an ERP backend, together with an RFC callback server being provided on a client side. The proposed event listener is responsible for checking the event history table for available events, for creating entries in a callback registry table, if no events are present, and for creating a placeholder ERP job which listens on ERP background processing events. When an ERP background processing event is raised, the corresponding ERP placeholder job runs and executes dedicated business logic to read the callback registry table and to notify all registered listeners using RFC callbacks.

The proposed methodology provides an asynchronous approach for event notification of an ERP system and thus eliminates the need of polling the event history table of the underlying ERP system. Any external client applications can listen to such RFC server notifications whenever a specific ERP event was raised.

Embodiments of the present invention improve performance of external enterprise schedulers, to reduce the necessary workload for notification processing and to reduce the required network traffic and enables ad-hoc actions based on ERP events.

The foregoing and other objects, features and advantages of the disclosure will be apparent from the following more particular descriptions of exemplary embodiments of the invention as illustrated in the accompanying drawings wherein identical or functionally similar elements or features are designated using identical reference numerals. It is to be understood that both the foregoing general description and the following detailed description are exemplary and explanatory only and are not restrictive.

BRIEF DESCRIPTION

DETAILED DESCRIPTION

Figure 1:
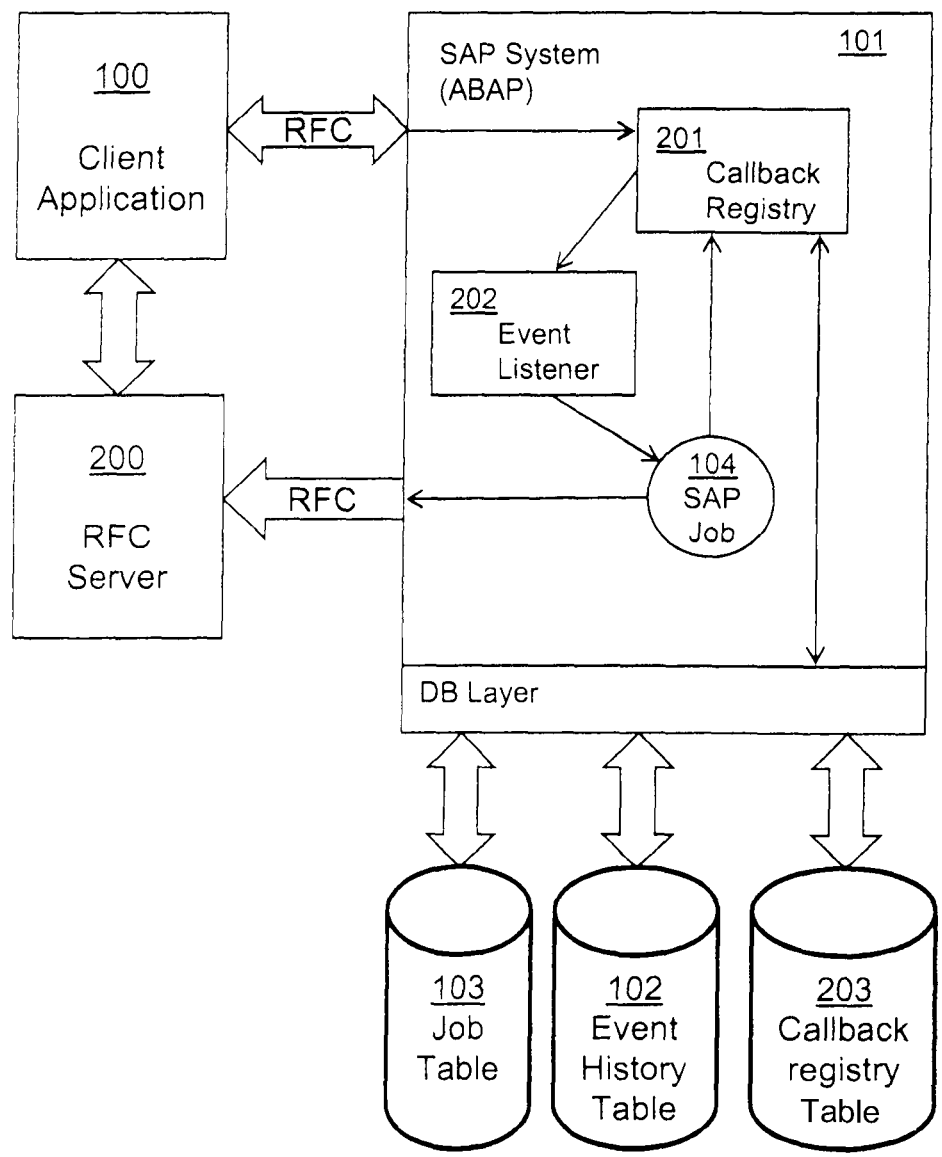
FIG. 1 is an overview block diagram of main components of an ERP system according to one embodiment of the present disclosure.

In the following description, the well-known SAP system offered by SAP AG is used as an example of an ERP system. However, it is well understood that the present disclosure and the implementation details described in the following can also be applied to other ERP or similar data processing systems.

In a SAP system, a client application has a dependency to one or more SAP background processing events. Those events with their status information may be queried from external (non-SAP) applications using an RFC layer and by calling appropriate SAP function modules in the SAP system. The status information may be gathered using a polling mechanism and returned to the client in synchronous calls from the event history table. The event history table can be accessed or queried through a DB layer which is arranged between the SAP system and the event history table.

Inside an ERP platform, such as an SAP Net Weaver Basis within the well-known 'SAP R/3' (registered trademark by SAP AG) platform, background processing events may be generated on specific situations inside the ERP system and may be related to business and non-business activities. Such events may be generated automatically by the ERP system or triggered by ERP users. In particular, those events can be used to connect workflow inside the ERP system to external applications.

Such an SAP event, from a technological perspective, may be a flag that is created in the SAP system. This flag can be triggered within SAP R/3 by an R/3 kernel, by a user using the SAP R/3 user interface, or it can be triggered even at the operating system level.

The external application may access an event history table of the ERP system via a dedicated interface. This interface may allow an RFC to access or query the event history table, but the access may be performed in the mentioned 'polling mode' which requires a continuous checking of the event history table by the external application to obtain the current state of the event history table. This continuous checking is commonly achieved by sending messages to the event history table asking whether it has anything to communicate or not.

The 'Advanced Business Application Programming' (ABAP) language is the report language for the SAP R/3 platform which enables building of mainframe business applications for materials management and financial and management accounting. ABAP was one of the first programming languages to include the concept of Logical Databases (LDBs), which provides a high level of abstraction from the basic database level, and was originally used by SAP developers to develop the SAP R/3 platform. But ABAP was also intended to be used by users of the SAP system to enhance SAP applications so that customers can develop custom reports and interfaces with ABAP programming.

In SAP R/3, all ABAP programs reside inside a dedicated SAP database i.e. they are not stored in separate external files like Java or C−+ programs. In that database, ABAP code exists in two forms, namely a source code that can be viewed and edited with an ABAP workbench and a "compiled" code that is loaded and interpreted by an ABAP runtime system.

ABAP programs may run on an SAP application server, under control of the above-mentioned runtime system, wherein the SAP application server is part of an SAP kernel. The runtime system is responsible for processing ABAP statements, controlling the flow logic of screens and responding to events, such as a user pushing a screen button. A key component of the ABAP runtime system is the Database Interface, which turns database-independent ABAP statements ("Open SQL") into statements understood by the underlying DBMS ("Native SQL"). The database interface handles all the communication with the relational database on behalf of ABAP programs: it also contains extra features such as buffering of frequently accessed data in the local memory of the application server.

In addition, the ERP platform may comprise a Remote function Call (RFC) which is an application program interface to the mentioned R/3 applications. A remote function call (RFC) is the call of a function module that runs in a system external to the calling program. Although it is also possible to call a function module in the same system as an RFC, normally RFCs are used when the caller and the called function module do not run in the same system. In the SAP system, these functions are provided by a RFC interface system. The RFC interface system enables function calls between two SAP systems, or, between the SAP system and the external application. SAP customers who wish to write other applications that communicate with R/3 applications and databases can use the RFC interface to do so.

Regarding the above mentioned polling mechanism, the external client application may wait for ERP events by way of a loop which starts after an entry by the user and may be exited by the user also. The external application may poll the SAP event history table periodically using a checkEvent( ) command. Between such polling events, the loop is in a sleep( ) mode.

The underlying communication (interaction) protocol of the pre-described polling mechanism is now described. The client application may send a query to an RFC client which is implemented, for example, at the external application (client-side). The RFC client transmits the query using the known TCP/IP transmission protocol, for example, to an RFC server which is implemented at or near the ERP system. The RFC server may then transmit the query to the event history table. Having read the event history table, the resulting information is first transmitted to the RFC server and from the RFC server to the RFC client again using TCP/IP transmission protocol. Finally, the RFC client provides the resulting information to the client application.

FIG. 1 shows an embodiment of the present invention. A client application 100 may start an RFC server 200 to be able to receive callback events from external applications like applications running on the present SAP system 101. Following this activity, an SAP backend callback mechanism with a callback registry 201 may be initialized.

Triggered from the client application 100, the callback registry 201 may verify the event history table 102 to query for existing SAP background processing events. If corresponding events are present, the function may stop here and the client can shut down the callback RFC server 200.

If no events are present, the callback registry may invoke an event listener 202 which may create and initialize an SAP background processing job 104 with a start condition 'after event'. The callback registry may further assign event data and related parameters to the background processing job 104. Additionally, the callback information being received from the client applications RFC server may be stored in the callback registry table 203. The job may be released after this activity to listen on SAP background processing events. After the initialization on the SAP backend is finished, the call returns to the client application.

In one embodiment, upon an SAP background processing event being raised, the corresponding job 104 starts execution. The job may run an associated ABAP report in order to read the callback registry 201 and to notify all registered client's RFC callback servers 200 to listen to the corresponding SAP background processing event. This notification wakes the client, which continues its processing without using a polling mechanism.

Figure 2:
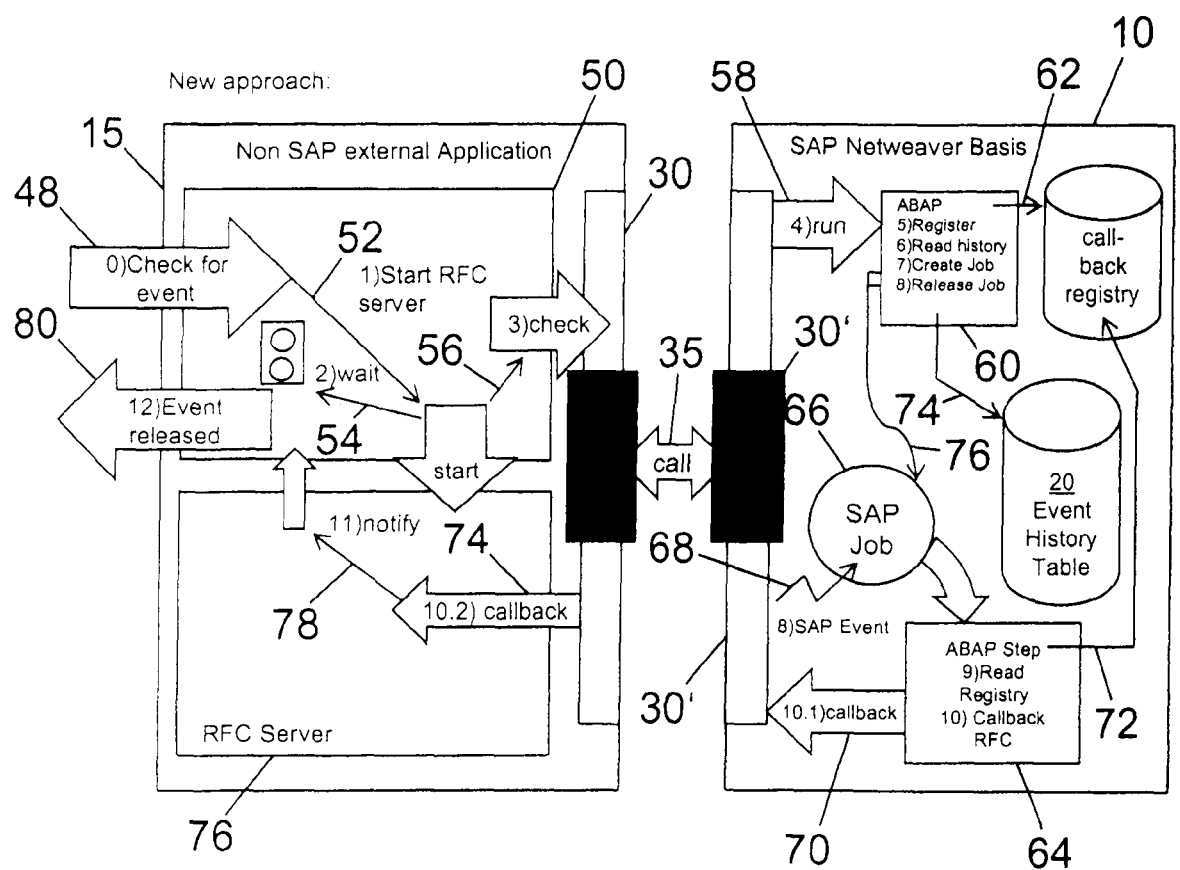
FIG. 2 depicts a process flow of the ERP system according to one embodiment of the present disclosure.

As illustrated in FIG. 2, in an embodiment, an RFC server is implemented in the client application wherein the RFC server waits on callback notifications from SAP. In one embodiment, those notifications are sent by additional code in the SAP system whenever a specific SAP event was generated or thrown inside SAP. To do so, the client application (which is interested in a specific SAP event) may run a dynamic allocated ABAP program which registers itself in a new SAP table, storing the client's callback information. After this, a standard SAP job may be created for use as a placeholder job. The job may have a start condition 'after event', waiting on the event to be thrown. Additionally, the event history may be taken into account. If no event with the requested ID is available in the history table, the client application may wait on the RFC callback. If the event is thrown inside SAP, the placeholder job is released, reads the callback registration table and notifies the listeners (the external clients implementing the RFC server). Now the external client application wakes up and continues its processing.

Now referring to FIG. 2, one embodiment of a process flow of the ERP system is described. An external client application 15 may be launched to interact with an SAP backend system, listening on SAP background processing events. It may initialize its main thread 50 and is then ready to receive requests 48 to query for named SAP background processing events. Once a request 48 arrives, an RFC server start sequence 52 may be executed. This sequence may launch the RFC server 76 and initialize a common shared object in waiting state 54. Once the initialization has finished, the client application 15 may invoke the RFC layer and call on the SAP backend system 10 the remote RFC layer 30' to run an ABAP program 60.

The ABAP program 60 may register 62 itself in a callback registry, storing the callback information provided by the client application 15 of its RFC server 76. After registration, the event history table 20 may be queried 74 for the named SAP background processing event.

If a corresponding event record is available in the event history table 20, the ABAP report 60 may return to the client applications main thread 50. The RFC server 76 may stop and the client application 15 may inform its caller that the event was raised 80.

If no event record is available in the event history table 20 the ABAP program 60 may create a job 66 with start condition 'after event' and release the job. The job may get an ABAP report assigned which is executed when the job runs. The ABAP report 60 may return to the client application's main thread 50 and wait until the RFC server 76 is notified from the SAP system, such as, for example, through calling the RFC servers 76 callback function 74.

Once an SAP background processing event is raised 68 in the SAP system 10, the previously released job 66 runs and executes the assigned ABAP program 64, which may read 72 the callback registry load the connection data of all registered RFC servers 76 and perform the callback operation 70 via the RFC layer 30' to the client's RFC layer. The ABAP program may invoke the RFC server callback routine 74. The RFC server 76 may notify 78 the client applications 15 common shared object. This informs 80 the caller that the event was raised.

Client applications can listen on RFC server notifications whenever a specific ERP event is raised. External enterprise schedulers (such as Tivoli Workload Scheduler for Applications), reduce workload and network traffic and allow ad hoc actions based on SAP events.

Figure 3:
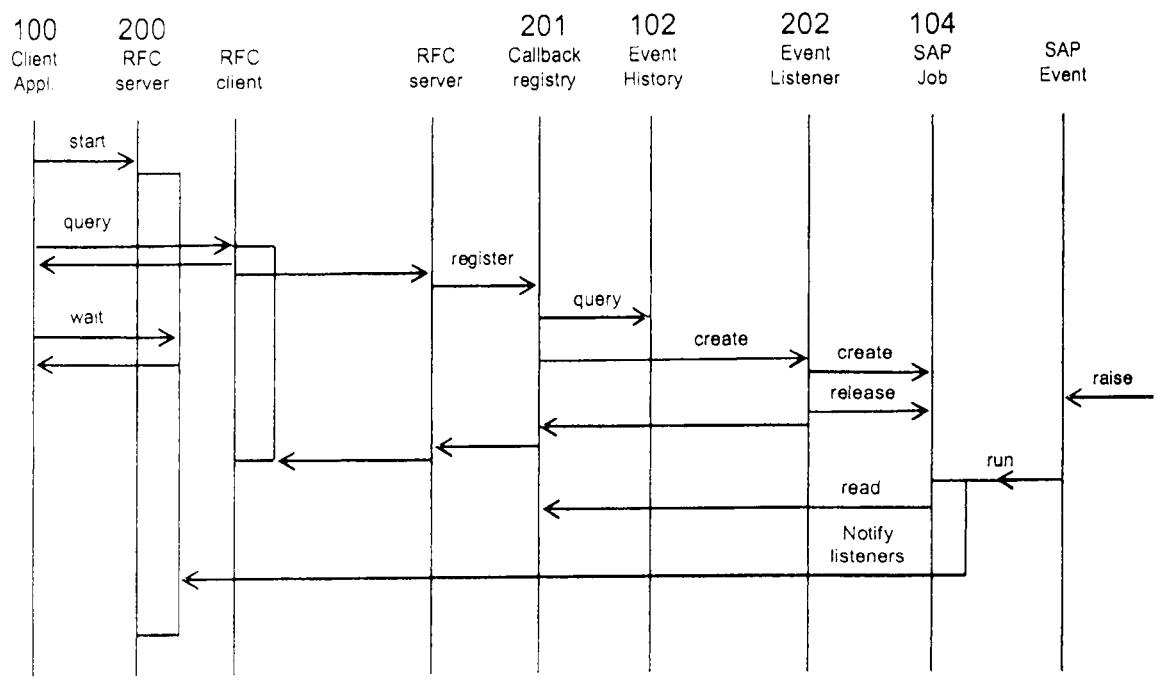
FIG. 3 depicts an interaction protocol of the ERP system according to one embodiment of the present disclosure.

The above described process flow illustrated in FIG. 2 can be summarized by the following process steps which are also shown in FIG. 2:
0) Check for event
1) Start RFC server
2) Wait
3) Check
4) Run
5) Register
6) Read history
7) Create Job
8) Release Job
9) Read Registry
10) Callback RFC
10.1) callback
10.2) callback
11) Notify
12) Event released FIG. 3 illustrates the underlying communication (interaction) protocol of the above described methodology according to an embodiment of the present invention. The client application 100 may send a 'start' command to the RFC server 200 in order to start the server. The RFC server 200, as a default, waits for incoming RFC calls. Next, the client application 100 may send a 'query' call to the local RFC layer. This query call may be forwarded to the callback registry 201 which may invoke a 'query' call on the event history 102. If no event record is found in the event history table, the callback registry may call the event listener 202 to create a placeholder job. The event listener 202 creates and releases a job 104 and returns to the caller. The client application 100 may then go into a wait state by calling the RFC servers 'wait' method.

Once a SAP event is raised, the job 104 runs its assigned code, which calls the callback registries 'read' method to load the registered clients callback addresses. Each registered client RFC server 200 is notified and the client application 100 continues its processing.

Embodiments of the present invention can be realized in hardware, software, or a combination of hardware and software. Any kind of computer system may be used. A typical combination of hardware and software could be a general-purpose computer system with a computer program that, when loaded and executed, controls the computer system such that it carries out the methods described herein. Embodiments of the present invention can also be a computer program product, disposed upon a computer-readable medium, comprising computer program instructions, which comprises all the features enabling the implementation of the methods described herein and which, when loaded in a computer system, is able to carry out these methods.

Computer program in the present context mean any expression, in any language, code or notation, of a set of instructions intended to cause a system having an information processing capability to perform a particular function either directly or after either or both of the following a) conversion to another language, code or notation; b) reproduction in a different material form.

It should be understood that the inventive concepts disclosed herein are capable of many modifications. To the extent such modifications fall within the scope of the appended claims and their equivalents, they are intended to be covered by this patent.

What is claimed is:

1. A computer-implemented method for operating an enterprise resource planning system, the method comprising:
running a placeholder job provided by said enterprise resource planning system in the enterprise resource planning system in response to a request from at least one client application for notification of at least one background processing event, the placeholder job is executed in response to the at least one background processing event, the placeholder job is configured to notify a server component of the at least one background processing event, the server component is a callback listener which is arranged at a backend of the enterprise resource planning system and which communicates with a callback server arranged on a client side, a callback registry is used for checking the event history table for available events, for creating entries in a callback registry table, if no events are present, and for calling an event listener which creates the placeholder job with a start condition that listens on background processing events, wherein, if the listening placeholder job detects the background processing event of the enterprise resource planning system, then the corresponding placeholder job executes an assigned business logic in order to read said callback registry table and to notify all registered callback servers to listen to the corresponding background processing event using callbacks, the notifying all registered call back servers wakes the client application that is informed that the at least one background processing event was raised, the client application continuing its processing without using a polling mechanism.

2. The method according to claim 1, wherein the placeholder job is scheduled to be executed in response to the at least one background processing event.

3. The method according to claim 1, further comprising using an event history table to capture past occurrences of an event.

4. The method according to claim 1, wherein the server component serves a function call and wherein said server component is configured to notify the client application of the background processing event.

5. The method according to claim 1, wherein the server component is a remote function call server.

6. The method according to claim 1, wherein the placeholder job stores connection information of the server component in a table.

7. The method according to claim 1, wherein the placeholder job is in Advanced Business Application Programming language format.

8. The method according to claim 1, wherein the placeholder job is configured to call a plurality of server components.

9. A computer program product disposed on a non-transitory computer-readable medium for operating an enterprise resource planning system, the computer program product comprising:
computer program instructions for running a placeholder job provided by the enterprise resource planning system in the enterprise resource planning system in response to a request from at least one client application for notification of at least one background processing event; and
computer program instructions for executing the placeholder job in response to the at least one background processing event, the placeholder job is configured to notify a server component of the at least one background processing event, the server component is a callback listener which is arranged at a backend of the enterprise resource planning system and which communicates with a callback server arranged on a client side, a callback registry is used for checking the event history table for available events, for creating entries in a callback registry table, if no events are present, and for calling an event listener which creates the placeholder job with a start condition that listens on background processing events, wherein, if the listening placeholder job detects the background processing event of the enterprise resource planning system, then the corresponding placeholder job executes an assigned business logic in order to read said callback registry table and to notify all registered callback servers to listen to the corresponding background processing event using callbacks, the notifying all registered call back servers wakes the client application that is informed that the at least one background processing event was raised, the client application continuing its processing without using a polling mechanism.

10. The computer program product according to claim 9, wherein the server component serves a function call and wherein the server component is configured to notify the client application of the background processing event.

11. The computer program product according to claim 9, wherein the server component is a remote function call server.

12. A system for operating an enterprise resource planning system, the system comprising:
a processor; and
a computer memory operatively coupled to the processor; wherein the computer memory has disposed within it:
computer program instructions for running a placeholder job provided by the enterprise resource planning system in the enterprise resource planning system in response to a request from at least one client application for notification of at least one background processing event; and computer program instructions for executing the placeholder job in response to the at least one background processing event, the placeholder job is configured to notify a server component of the at least one background processing event, the server component is a callback listener which is arranged at a backend of the enterprise resource planning system and which communicates with a callback server arranged on a client side, a callback registry is used for checking the event history table for available events, for creating entries in a callback registry table, if no events are present, and for calling an event listener which creates the placeholder job with a start condition that listens on background processing events, wherein, if the listening placeholder job detects the background processing event of the enterprise resource planning system, then the corresponding placeholder job executes an assigned business logic in order to read said callback registry table and to notify all registered callback servers to listen to the corresponding background processing event using callbacks, the notifying all registered call back servers wakes the client application that is informed that the at least one background processing event was raised, the client application continuing its processing without using a polling mechanism.

13. The system according to claim 12, wherein the server component serves a function call and wherein the server component is configured to notify the client application of the background processing event.

* * * * *